United States Patent
Ko et al.

(10) Patent No.: US 11,830,162 B2
(45) Date of Patent: *Nov. 28, 2023

(54) IMAGE PROCESSING APPARATUS CONFIGURED TO PERFORM EDGE PRESERVING SMOOTHING AND IMAGE PROCESSING METHOD THEREOF

(71) Applicant: Samsung Electronics Co., Ltd., Suwon-si (KR)

(72) Inventors: Hyoungseok Ko, Suwon-si (KR); Sol Namkung, Seoul (KR); Ildo Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 93 days.

This patent is subject to a terminal disclaimer.

(21) Appl. No.: 17/328,033

(22) Filed: May 24, 2021

(65) Prior Publication Data

US 2021/0279839 A1 Sep. 9, 2021

Related U.S. Application Data

(63) Continuation of application No. 16/531,358, filed on Aug. 5, 2019, now Pat. No. 11,017,502.

(30) Foreign Application Priority Data

Dec. 5, 2018 (KR) ........................ 10-2018-0155470

(51) Int. Cl.
*G06T 3/40* (2006.01)
*G06T 5/00* (2006.01)
*G06T 5/20* (2006.01)

(52) U.S. Cl.
CPC .............. *G06T 3/403* (2013.01); *G06T 5/002* (2013.01); *G06T 5/20* (2013.01); *G06T 2207/20192* (2013.01)

(58) Field of Classification Search
CPC ........... G06T 3/403; G06T 5/002; G06T 5/20; G06T 2207/20192; G06T 2207/10004;
(Continued)

(56) References Cited

U.S. PATENT DOCUMENTS 8,189,944 B1   5/2012  Lim
8,761,507 B1   6/2014  Steger
(Continued)

FOREIGN PATENT DOCUMENTS

JP   2001-274990 A   10/2001

OTHER PUBLICATIONS

F.Durand, "Fast Bilateral filtering for the display of High-Dynamic-Range images" SIGGRAPH '02, 2002.
(Continued)

*Primary Examiner* — Chan S Park
*Assistant Examiner* — Daniel C Chang
(74) *Attorney, Agent, or Firm* — Harness, Dickey & Pierce, P.L.C.

(57) ABSTRACT

An image processing apparatus includes a low-resolution image generating circuit configured to generate a low-resolution image including a second pixel corresponding to first pixels based on an input image including the first pixels, and an edge preserving smoothing circuit configured to generate a reliability of the second pixel based on characteristics of values of the first pixels and perform edge preserving smoothing on the input image using a value of the second pixel of which a reflection ratio is adjusted, based on the reliability of the second pixel.

20 Claims, 16 Drawing Sheets

(58) Field of Classification Search
CPC .................. G06T 7/181; G06T 1/20; G06T 2207/20024
See application file for complete search history.

(56) References Cited

U.S. PATENT DOCUMENTS

| | | | |
|---|---|---|---|
| 2010/0111394 A1* | 5/2010 | Okamura | G06T 7/13 |
| | | | 382/199 |
| 2011/0176744 A1 | 7/2011 | Ko et al. | |
| 2011/0268368 A1 | 11/2011 | Toyoda et al. | |
| 2014/0328509 A1* | 11/2014 | Guissin | G06T 5/002 |
| | | | 382/100 |
| 2014/0347526 A1* | 11/2014 | Hara | H04N 25/60 |
| | | | 348/241 |
| 2015/0016720 A1 | 1/2015 | Vermeir | |
| 2015/0104112 A1 | 4/2015 | Levy | |
| 2016/0086316 A1* | 3/2016 | Lee | H04N 9/646 |
| | | | 382/167 |
| 2018/0020174 A1* | 1/2018 | Maruyama | H04N 5/213 |

OTHER PUBLICATIONS

K. He, J. Sun, and X. Tang, "Guided Image Filtering," IEEE Trans. Pattern Anal. Mach. Intell., vol. 35, No. 6, pp. 1397-1409, Jun. 2013.

Indian Office Action dated Jan. 4, 2023 issued in corresponding Indian Appln. No. 201924050072 (with English translation).

Singapore Office Action dated May 30, 2023 issued in corresponding Singapore Appln. No. 10201911633Y.

D. Min et al., Fast Global Image Smoothing Based on Weighted Least Squares. *IEEE Transactions on Image Processing*, Oct. 31, 2014, vol. 23, No. 12, pp. 5638-5653.

Dellaert F. et al., Fast Image-Based Tracking by Selective Pixel Integration. *ICCV '99 Workshop on Frame-Rate Vision*, Mar. 31, 2000, pp. 1-21.

* cited by examiner

IMAGE PROCESSING APPARATUS CONFIGURED TO PERFORM EDGE PRESERVING SMOOTHING AND IMAGE PROCESSING METHOD THEREOF

CROSS-REFERENCE TO RELATED APPLICATION

This application is a continuation of U.S. application Ser. No. 16/531,358, filed on Aug. 5, 2019, which claims the benefit of Korean Patent Application No. 10-2018-0155470, filed on Dec. 5, 2018, in the Korean Intellectual Property Office, the disclosure of each of which is incorporated herein in its entirety by reference.

BACKGROUND

The inventive concepts relate to an image processing apparatus, and more particularly, to an image processing apparatus configured to perform edge preserving smoothing using a low-resolution image and an image processing method of the image processing apparatus.

When edge preserving smoothing is performed using an edge preserving smoothing filter having a wide tap, a low-resolution image may be used as a guided image to perform a high-speed image processing operation. In this case, since an edge preserving characteristic is not considered in a down-sampling operation for generating the low-resolution image, edge preserving performance deteriorates during edge preserving smoothing using the low-resolution image.

SUMMARY

The inventive concepts provide an image processing apparatus configured to improve edge preserving performance when edge preserving smoothing is performed using a low-resolution image, and an image processing method of the image processing apparatus.

According to some example embodiments of the inventive concepts, there is provided an image processing apparatus including a processor configured to generate a low-resolution image including a second pixel from an input image comprising first pixels, the second pixel corresponding to first pixels, and perform edge preserving smoothing on the input image using a value of the second pixel of which a reflection ratio is adjusted, based on the reliability of the second pixel.

According to some example embodiments of the inventive concepts, there is provided an image processing method for performing edge preserving smoothing. The method includes generating a low-resolution image including second pixels based on an input image including first pixels, generating a reliability of each of the second pixels based on a characteristic of values of the first pixels corresponding respectively to the second pixels, and performing edge preserving smoothing on the input image using values of the second pixels of which a reflection ratio is adjusted, based on the reliability of each of the second pixels.

According to some example embodiments of the inventive concepts, there is provided an apparatus including at least one processor, and a memory configured to store instructions. The at least one processor is configured to generate a low-resolution image including second pixels based on an input image including first pixels, generate a reliability indicating an edge smoothing degree of each of the second pixels based on a variation degree of values of the first pixels corresponding respectively to the second pixels, and perform edge preserving smoothing on the input image by limitedly using values of the second pixels based on the reliability.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
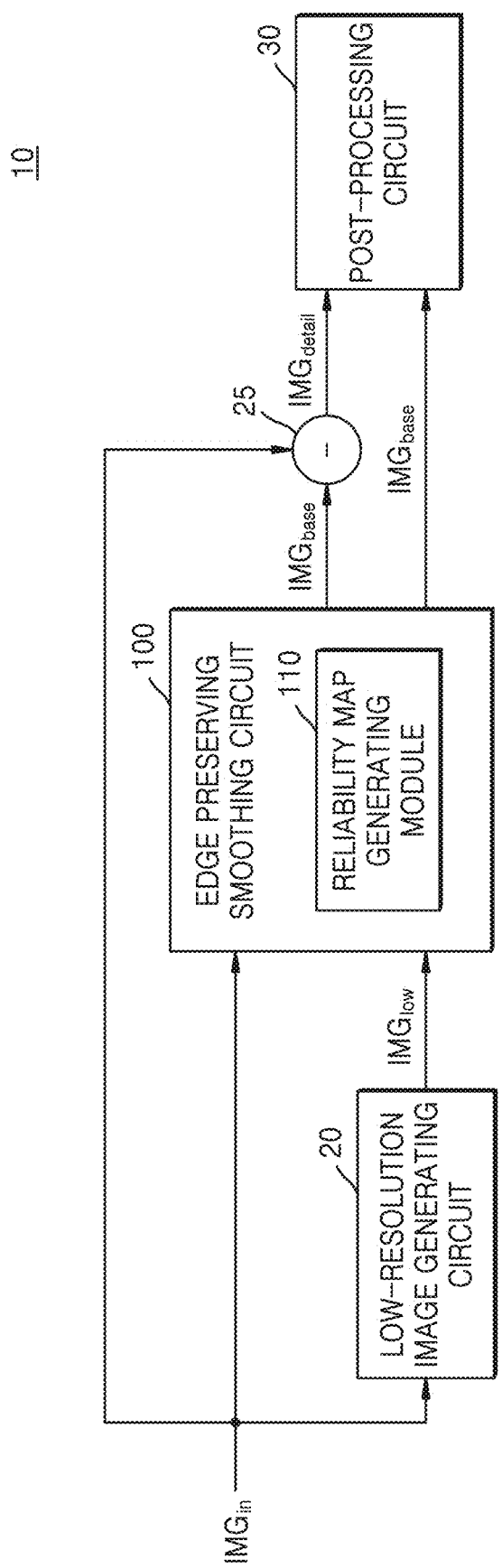
FIG. 1 is a block diagram of an image processing apparatus according to some example embodiments.

FIG. 1 is a block diagram of an image processing apparatus 10 according to some example embodiments.

Referring to FIG. 1, the image processing apparatus 10 may include a low-resolution image generating circuit 20, an edge preserving smoothing circuit 100, an image subtracter 25, and/or a post-processing circuit 30. The image processing apparatus 10 may further include components that are not shown in FIG. 1 and is not limited to the configuration shown in FIG. 1. Also, the low-resolution image generating circuit 20, the edge preserving smoothing circuit (or edge preserving smoothing filter) 100, and/or the post-processing circuit 30 may be implemented in various forms such as hardware, software, or a hardware/software integrated form. Furthermore, the edge preserving smoothing circuit 100, the low-resolution generating circuit 20, the image subtracter, and/or the post-processing circuit 30 may be implemented as a portion of a processor configured to perform specific operations based on inputs or execute instructions in code and perform specific operations. The processor may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. Hereinafter, it is assumed that an edge in an image processing technique refers to a portion in which the brightness of an image is suddenly changed. The sudden change in the brightness of the image may generally indicate the occurrence of a major change in a subject.

The low-resolution image generating circuit 20 may include an input image $IMG_{in}$, perform a down-sampling operation (or a sub-sampling operation) on the input image $IMG_{in}$, and generate a low-resolution image $IMG_{low}$. Hereinafter, a pixel including the input image $IMG_{in}$ will be referred to as a first pixel, and a pixel including the low-resolution image $IMG_{low}$ will be referred to as a second pixel. In some example embodiments, the low-resolution image generating circuit 20 may generate a low-resolution image $IMG_{low}$ including a second pixel corresponding to first pixels based on an input image $IMG_{in}$ including the first pixels. That is, the second pixel may be a sample that is generated by down-sampling a region of the input image $IMG_{in}$ corresponding to the coordinates of the first pixels. Thus, the region of the input image $IMG_{in}$ corresponding to the coordinates of the first pixels may correspond to a region of the low-resolution image $IMG_{low}$ corresponding to the coordinates of the second pixel. The low-resolution image $IMG_{low}$ may include a plurality of second pixels, and the input image $IMG_{in}$ may include a plurality of first pixels corresponding respectively to the plurality of second pixels.

The edge preserving smoothing circuit 100 may include a reliability map generating module 110. In some example embodiments, the reliability map generating module 110 may calculate reliabilities of the second pixels of the low-resolution image $IMG_{low}$ and generate a reliability map. A reliability may be a parameter, which may be determined according to an edge smoothing degree of the second pixels and used to adjust a reflection ratio of values of the second pixels when the edge preserving smoothing circuit 100 performs edge preserving smoothing. When the edge preserving smoothing is performed using the low-resolution image $IMG_{low}$ by using a value of a second pixel having a high edge smoothing degree without adjusting a reflection ratio of the value of the second pixel, edge preserving performance may deteriorate. Edge smoothing degrees of the second pixels of the low-resolution image $IMG_{low}$ may be respectively different and may be determined according to characteristics of values of the first pixels of the input image $IMG_{in}$, which correspond to the second pixels, respectively. Accordingly, the reliability map generating module 110 may generate the reliabilities of the respective second pixels based on the characteristics of the values of the first pixels, which correspond to the second pixels, respectively. Specifically, the reliability map generating module 110 may generate the reliabilities of the second pixels based on variation degrees of the values of the first pixels, which correspond to the second pixels, respectively. When a variation degree of the values of the first pixels corresponding to the second pixel exceeds a first reference degree, the reliability map generating module 110 may determine an edge smoothing degree to be very high and generate a reliability of a second pixel having a very low value (e.g., a value close to a value '0'). When a variation degree of the values of the first pixels corresponding to the second pixel is below a second reference degree, the reliability map generating module 110 may determine an edge smoothing degree to be very low and generate a reliability of a second pixel having a very high value (e.g., a value close to a value '1'). That is, it may be inferred that when a variation degree of the values of the first pixels is high, the second pixel may have a high edge smoothing degree in proportion to the variation degree.

In some example embodiments, the edge preserving smoothing circuit 100 may adjust the reflection ratio of the values of the second pixels of the low-resolution image $IMG_{low}$ for edge preserving smoothing by using the reliability map and perform edge preserving smoothing on the input image $IMG_{in}$ using the values of the second pixels of which the reflection ratio is adjusted. As an example, the edge preserving smoothing circuit 100 may perform edge preserving smoothing using the reliability map as shown in Equations 1 and 2:

$$\tilde{I}(x) = \frac{1}{C} \Sigma_{y_{low} \in \theta} f(y_{low} - x) \cdot g(I_{y_{low}} - I_x) \cdot f_{adj}(\delta(y_{low})) \cdot I(y_{low}), \quad (1)$$

and $$C = \Sigma_{y_{low} \in \theta} f(y_{low} - x) \cdot g(I_{y_{low}} - I_x) \cdot f_{adj}(\delta(y_{low})) \quad (2),$$

wherein x denotes a target pixel (e.g., a pixel on which edge preserving smoothing is to be performed) and θ denotes a filter range. C is a normalized value of a filter result of the target pixel x, that is, the sum of coefficients of a first function f and a second function g of a second pixel $y_{low}$ (or a reference pixel) in the low-resolution image $IMG_{low}$ having the filter range θ. The first function f may be used to obtain a coefficient that is dependent on a distance between the target pixel x and the reference pixel $y_{low}$, and the second function g may be used to obtain a coefficient that is dependent on a difference between a pixel value (or pixel size) $I_x$ of the target pixel x and a pixel value $I_{y_{low}}$ of the second pixel $y_{low}$. A reliability function $f_{adj}$ may be used to obtain a reliability of the second pixel $y_{low}$ by applying a characteristic value $\delta(y_{low})$ of first pixels of the input image $IMG_{in}$ corresponding to the second pixel $y_{low}$ as a variable. The obtained reliability $f_{adj}(\delta(y_{low}))$ may be used to adjust a reflection ratio of the pixel value $I_{y_{low}}$ of the second pixel $y_{low}$ for edge preserving smoothing.

In some example embodiments, the reliability map generating module 110 may calculate a standard deviation or variance of values of the first pixels of the input image $IMG_{in}$ as the characteristic value $\delta(y_{low})$ of the first pixels of the input image $IMG_{in}$ corresponding to the second pixel $y_{low}$. In some example embodiments, the reliability map generating module 110 may calculate a difference between a maximum value and a minimum value of the first pixels of the input image $IMG_{in}$ as the characteristic value $\delta(y_{low})$ of the first pixels of the input image $IMG_{in}$ corresponding to the second pixel $y_{low}$. In some example embodiments, the reliability map generating module 110 may calculate values of the first pixels of the input image $IMG_{in}$ based on frequency component characteristics by applying a high pass filter or a band pass filter as the characteristic value $\delta(y_{low})$ of the first pixels of the input image $IMG_{in}$ corresponding to the second pixel $y_{low}$ to the input image $IMG_{in}$.

The reliability map generating module 110 may generate the reliability of the second pixel $y_{low}$ by applying the characteristic value $\delta(y_{low})$ of the first pixels of the input image $IMG_{in}$ corresponding to the second pixel $y_{low}$ to the reliability function $f_{adj}$. A detailed description of the reliability function $f_{adj}$ will be presented with reference to FIG. 7.

The edge preserving smoothing circuit 100 according to some example embodiments may adjust the reflection ratio of the values of the second pixels for edge preserving smoothing by using the reliability map of the second pixels of the low-resolution image $IMG_{low}$. As a result, when the edge preserving smoothing circuit 100 performs edge preserving smoothing using the low-resolution image $IMG_{low}$, a value of a pixel having a high edge smoothing degree, which may deteriorate edge preserving performance, may be limitedly reflected on the basis of a reliability during edge preserving smoothing so that the edge preserving performance may be enhanced.

As a result of the edge preserving smoothing, the edge preserving smoothing circuit 100 may generate a base image $IMG_{base}$ indicating an edge of the input image $IMG_{In}$ based on the input image $IMG_{in}$. The edge preserving smoothing unit 100 may reduce the amount of calculation for extracting the base image $IMG_{base}$ while simultaneously enhancing the quality of the base image $IMG_{base}$ by considering characteristics of edge pixels. The base image $IMG_{base}$ may refer to an image obtained by leaving a portion having a sharply changed luminance in the input image $IMG_{in}$ and removing a portion having a minutely changed luminance from the input image $IMG_{in}$. The image subtracter 25 may remove the base image $IMG_{base}$ from the input image IMG and generate a detail image $IMG_{detail}$.

The post-processing circuit 30 may receive the base image $IMG_{base}$ and the detail image $IMG_{detail}$ and perform an image processing operation on at least one of the base image $IMG_{base}$ and the detail image $IMG_{detail}$. For example, the post-processing circuit 30 may perform an image processing operation, such as high dynamic range (HDR) compression, tone mapping, detail enhancement, and/or haze removal, by using at least one of the base image $IMG_{base}$ and the detail image $IMG_{detail}$.

Figure 2:
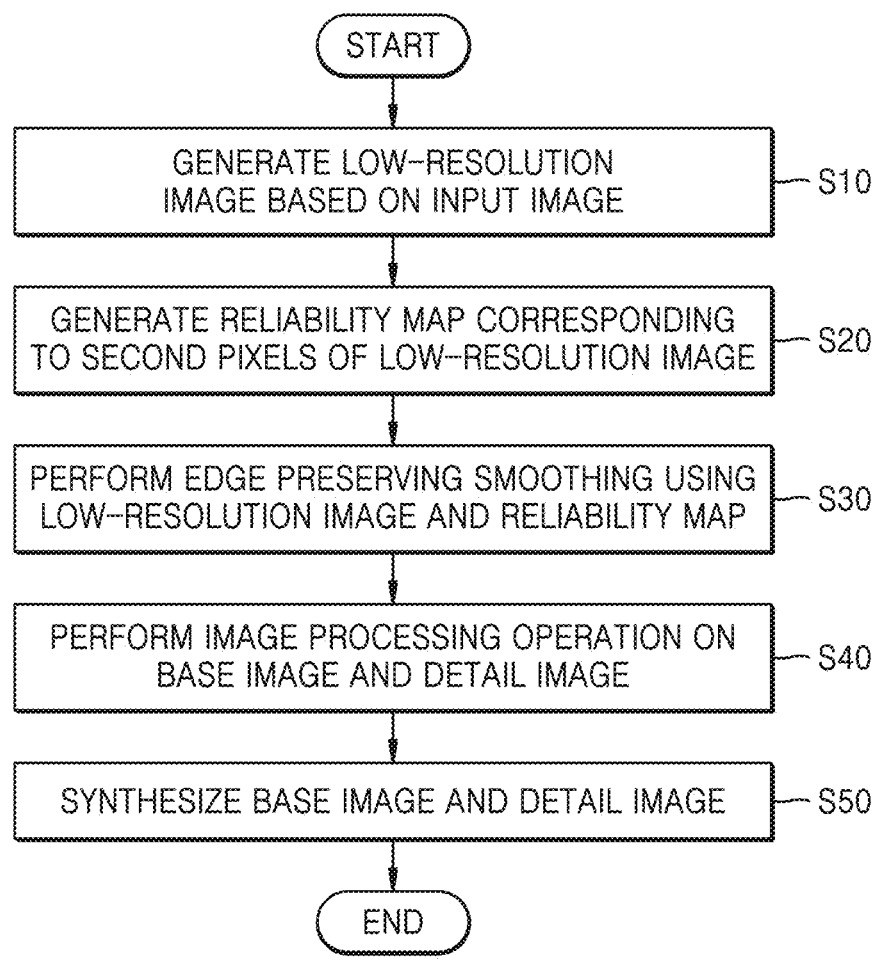
FIG. 2 is a flowchart of an image processing method of the image processing apparatus of FIG. 1.

FIG. 2 is a flowchart of an image processing method of the image processing apparatus 10 of FIG. 1. Hereinafter, the flowchart of FIG. 2 will be described with reference to FIG. 1.

Referring to FIG. 2, the low-resolution image generating circuit 20 may perform a down-sampling operation on an input image $IMG_{in}$ and generate a low-resolution image $IMG_{low}$ (S10). The reliability map generating module 110 may generate a reliability map corresponding to second pixels of the low-resolution image $IMG_{low}$ (S20). Specifically, the reliability map generating module 110 may generate a reliability of each of the second pixels based on characteristics of values of first pixels of the input image $IMG_{in}$ corresponding respectively to the second pixels of the low-resolution image $IMG_{low}$. The edge preserving smoothing circuit 100 may perform edge preserving smoothing using the low-resolution image $IMG_{low}$ and the reliability map (S30). Specifically, when the edge preserving smoothing circuit 100 performs edge preserving smoothing, the reliability map may be reflected in values of the second pixels of the low-resolution image $IMG_{low}$, and a reflection ratio of a value of a second pixel of which an edge smoothing degree exceeds a reference degree may be adjusted to a small value. The edge preserving smoothing circuit 100 may generate a base image $IMG_{base}$ as a result of the edge preserving smoothing and generate a detail image $IMG_{detail}$ using the image subtracter 25. The post-processing circuit 30 may perform an image processing operation on the base image $IMG_{base}$ and the detail image $IMG_{detail}$ (S40). Thereafter, the post-processing circuit 30 may synthesize the processed base image $IMG_{base}$ and the processed detail image $IMG_{detail}$ (S50).

Figure 3A:
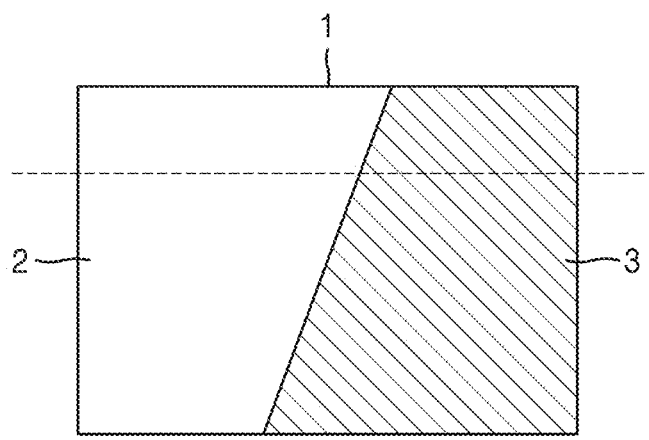
FIG. 3A is a diagram of an edge of an image.
Figure 3B:
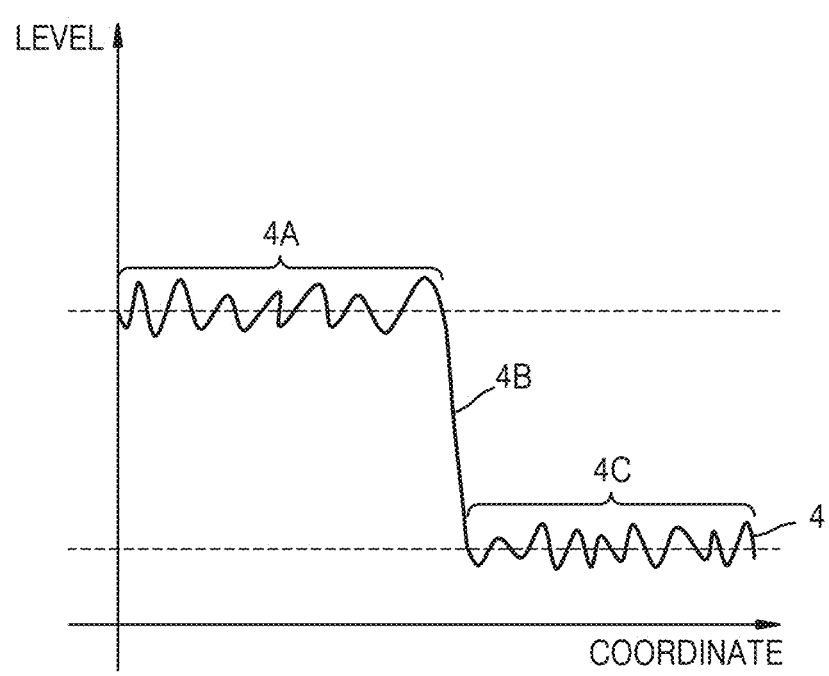
FIG. 3B is a graph for explaining an input image.
Figure 3C:
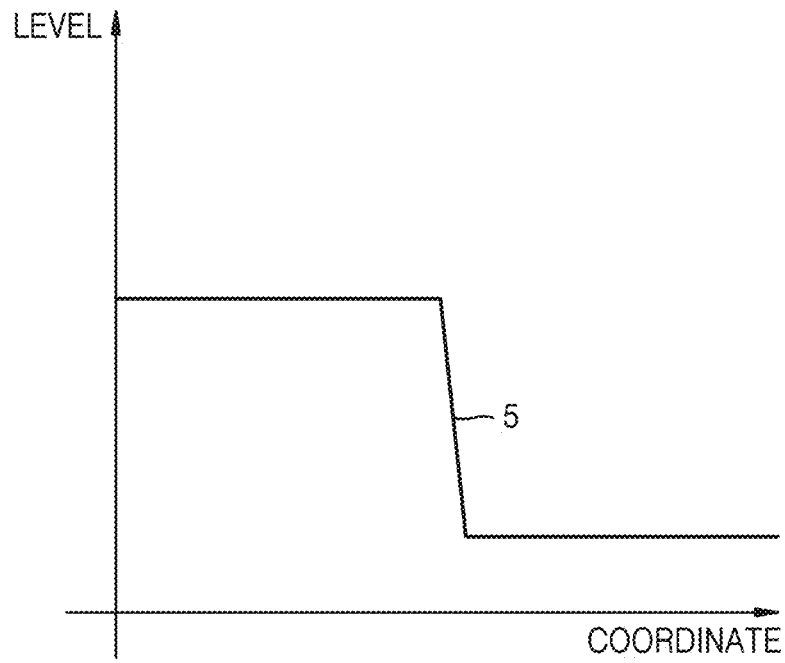
FIGS. 3C and 3D are graphs for explaining a base image.
Figure 3D:
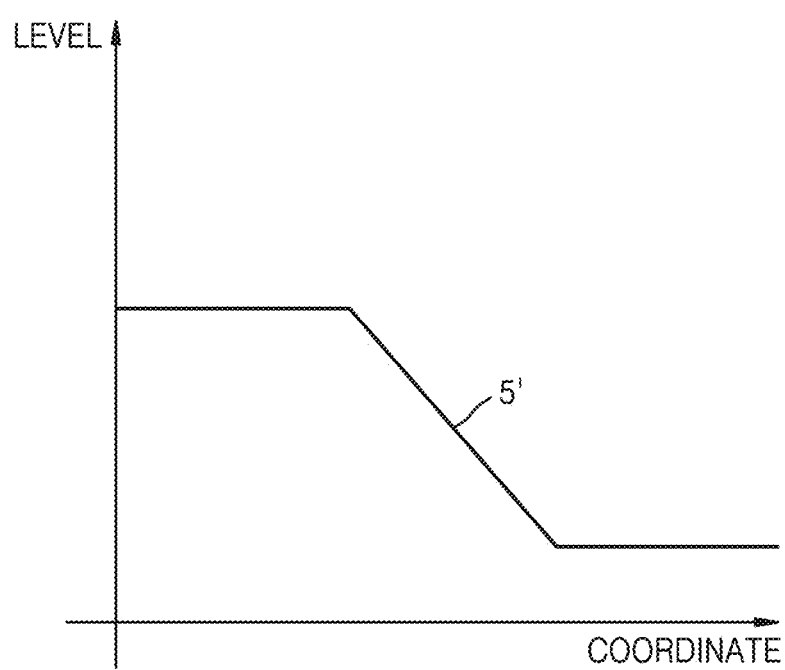

FIG. 3A is a diagram of an edge of an image 1, FIG. 3B is a graph for explaining an input image, and FIGS. 3C and 3D are graphs for explaining a base image.

Referring to FIG. 3A, the image 1 may include a first region 2 having a high luminance and a second region 3 having a low luminance. Referring further to FIG. 3B, a pixel size on a dashed line of the image 1 may be as shown by curve 4. In FIG. 3B, the abscissa denotes a position of the image 1 in a lateral direction, and the ordinate denotes a pixel size (or pixel value) of each pixel. Curve 4 may include a first component 4A corresponding to the first region 2 of FIG. 3A, a third component 4C corresponding to the second region 3 of FIG. 3A, and a second component 4B corresponding to an interface between the first region 2 and the second region 3 of FIG. 3A. The pixel size of the image 1 may be sharply changed in the second component 4B, and the pixel size of the image 1 may be minutely changed due to noise components in the first component 4A and the third component 4C.

When the edge preserving smoothing circuit (refer to 100 in FIG. 1) performs edge preserving smoothing on the image (refer to 1 in FIG. 3A), only the second component 4B indicating a change in luminance may be left in FIG. 3B, and only minute changes in the first component 4A and the third component 4C may be removed. As a result, a base image corresponding to curve 5 of FIG. 3C may be generated by the edge preserving smoothing circuit (refer to 100 in FIG. 1) based on an image corresponding to curve 4 of FIG. 3B. However, when edge preserving smoothing is performed using a low-resolution image by intactly reflecting values of second pixels of the low-resolution image, a base image having degraded edge preserving performance may be generated to correspond to curve 5' of FIG. 3D. The edge preserving smoothing circuit (refer to 100 in FIG. 1) according to some example embodiments may adjust a reflection ratio of each of values of the second pixels for edge preserving smoothing, based on a reliability map, to improve edge preserving performance.

Figure 4:
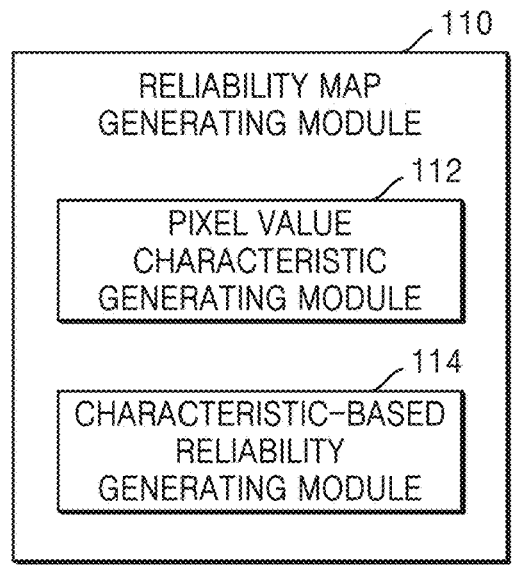
FIG. 4 is a block diagram of a reliability map generating module according to some example embodiments.

FIG. 4 is a block diagram of a reliability map generating module 110 according to some example embodiments.

Referring to FIG. 4, the reliability map generating module 110 may include a pixel value characteristic generating module 112 and/or a characteristic-based reliability generating module 114. The pixel value characteristic generating module 112 may obtain values of first pixels of an input image corresponding to one second pixel of a low-resolution image and generate a characteristic of the values of the first pixels. In some example embodiments, the pixel value characteristic generating module 112 may generate a predetermined (or alternatively, given) value indicating a variation degree of the values of the first pixels, and the generated value may correspond to a variable used to generate a reliability of the second pixel. In an example, the pixel value characteristic generating module 112 may perform a calculation for obtaining a standard distribution or variance of the values of the first pixels of the input image corresponding to the one second pixel of the low-resolution image, and the generated standard distribution or variance may be used to generate the reliability of the second pixel. In another example, the pixel value characteristic generating module 112 may perform a calculation for obtaining a difference between a maximum value and a minimum value of the values of the first pixels of the input image corresponding to the one second pixel of the low-resolution image, and the obtained difference may be used to generate the reliability of the second pixel. However, the pixel value characteristic generating module 112 according to the above-described example embodiments is only an example, and the inventive concepts are not limited thereto. The pixel value characteristic generating module 112 may generate various characteristics of the values of the first pixels of the input image, by which an edge smoothing degree of second pixels of the low-resolution image may be determined. In the above-described manner, the pixel value characteristic generating module 112 may generate characteristics respectively corresponding to the second pixels of the low-resolution image. In some example embodiments, the reliability map generating module 110 may not include the pixel value characteristic generating module 112 but directly receive, from another logic source, information required for generating the reliability of the second pixel of the low-resolution image.

The characteristic-based reliability generating module 114 may generate a reliability of each of the second pixels based on characteristics respectively corresponding to the second pixels of the low-resolution image generated by the pixel value characteristic generating module 112. In some example embodiments, the characteristic-based reliability generating module 114 may determine an edge smoothing degree of each of the second pixels based on the characteristics respectively corresponding to the second pixels of the low-resolution image and generate the reliability of each of the second pixels according to the edge smoothing degree. The characteristic-based reliability generating module 114 may generate reliabilities of the second pixels of the low-resolution image based on a reliability function. That is, the characteristic-based reliability generating module 114 may apply the characteristics (or characteristic values) respectively corresponding to the second pixels, which are received from the pixel value characteristic generating module 112, to the reliability function and generate the reliabilities of the second pixels. A detailed description of the reliability function will be described below with reference to FIG. 7.

Figure 5:
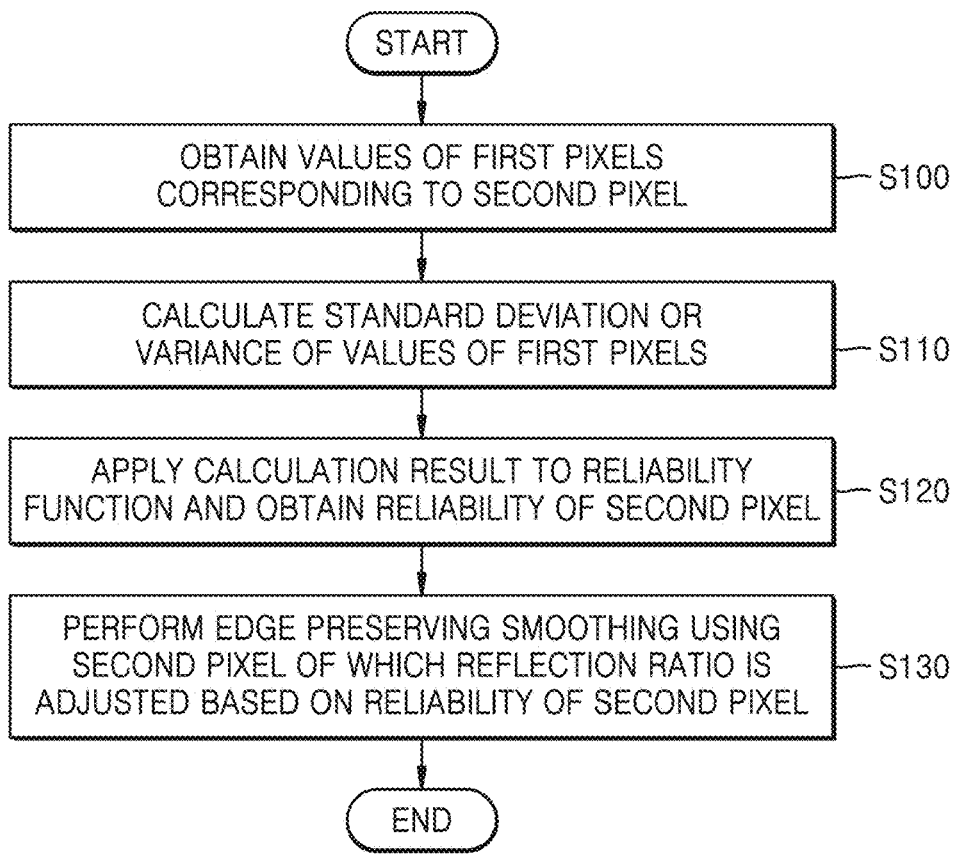
FIG. 5 is a flowchart of an edge preserving smoothing method of an edge preserving smoothing circuit, according to some example embodiments.

FIG. 5 is a flowchart of an edge preserving smoothing method of an edge preserving smoothing circuit, according to some example embodiments.

Referring to FIG. 5, the edge preserving smoothing circuit may obtain values of first pixels of an input image corresponding to a second pixel of a low-resolution image (S100). Thereafter, the edge preserving smoothing circuit may calculate a standard deviation or variance of the values of the first pixels (S110). The edge preserving smoothing circuit may apply the calculation result to a reliability function (S120). The edge preserving smoothing circuit may apply the calculation result to the reliability function and obtain a reliability of the second pixel. The edge preserving smoothing circuit may perform edge preserving smoothing on the input image using a value of the second pixel of which a reflection ratio is adjusted, based on the reliability of the second pixel (S130). In the above-described manner, the edge preserving smoothing circuit may adjust a reflection ratio of each of values of second pixels of the low-resolution image for edge preserving smoothing, based on reliabilities of all second pixels of the low-resolution image. As a result, the influence of pixels having a high edge smoothing degree may be minimized during edge preserving smoothing.

Figure 6A:
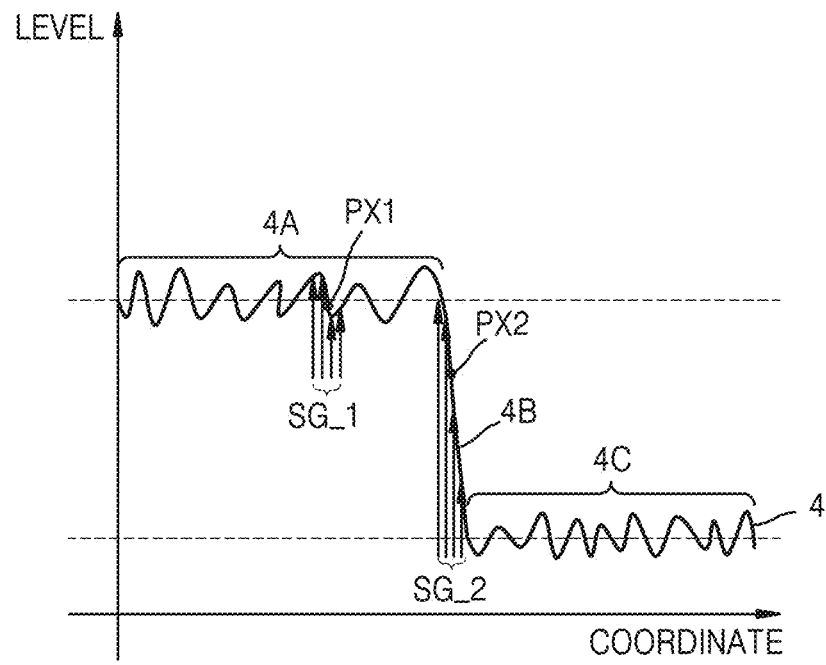
FIGS. 6A and 6B are graphs for explaining a method of generating reliabilities of second pixels of a low-resolution image in an edge preserving smoothing circuit, according to some example embodiments.
Figure 6B:
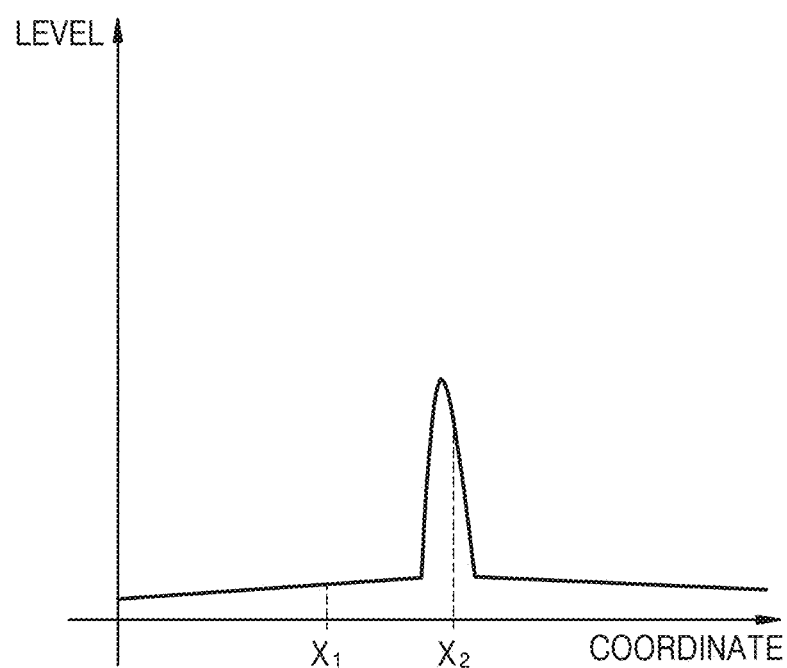

FIGS. 6A and 6B are graphs for explaining a method of generating reliabilities of second pixels of a low-resolution image in an edge preserving smoothing circuit, according to some example embodiments. Curve 4 of FIG. 6A shows a portion of the dashed line of the image 1 of FIG. 3A. A pixel 'PX1' of the low-resolution image may be generated by down-sampling a first component 4A. It may be assumed that pixels of an input image corresponding to the pixel 'PX1' are pixels 'SG_1.' The pixels 'SG_1' may also be generated by sampling the first component 4A. In addition, a pixel 'PX2' of the low-resolution image may be generated by down-sampling a second component 4B. It may be assumed that pixels of the input image corresponding to the pixel 'PX2' are pixels 'SG_2.' The pixels 'SG_2' may also be generated by sampling the second component 4B.

Referring to FIG. 6A, a variation degree of the pixels 'SG_1' corresponding to the pixel 'PX1' may be minute, and thus, the pixel 'PX1' may have a minute edge smoothing degree. In contrast, a variation degree of the pixels 'SG_2' corresponding to the pixel 'PX2' may be very large, and thus, the pixel 'PX2' may have a very large edge smoothing degree. Accordingly, a value of the pixel 'PX1' may be intactly used for edge preserving smoothing, while it may be necessary to adjust a reflection ratio of a value of the pixel 'PX2' during edge preserving smoothing because the value of the pixel 'PX2' may deteriorate edge preserving performance.

To generate reliabilities of the second pixels of the low-resolution image including the pixel 'PX1' and the pixel 'PX2,' the edge preserving smoothing circuit according to some example embodiments may calculate a standard deviation (or variance) of values of first pixels of the input image, which respectively correspond to the second pixels of the low-resolution image. The calculated standard deviation is represented graphically in FIG. 6B.

Referring to FIG. 6B, the edge preserving smoothing circuit may generate a standard distribution value STD of a coordinate '$X_1$' corresponding to a pixel 'PX1,' and generate a standard distribution value STD of a coordinate '$X_2$' corresponding to a pixel 'PX2.' The standard distribution value STD may be used to generate reliabilities of second pixels of a low-resolution image including the pixel 'PX1' and pixel 'PX2.' However, the edge preserving smoothing circuit is only an example, and the inventive concepts are not limited thereto. As described above, the edge preserving smoothing circuit may calculate a difference between a maximum value and a minimum value of values of first pixels of an input image, which respectively correspond to the second pixels of the low-resolution image, to generate the reliabilities of the second pixels of the low-resolution image including the pixel 'PX1' and pixel 'PX2.'

Figure 7:
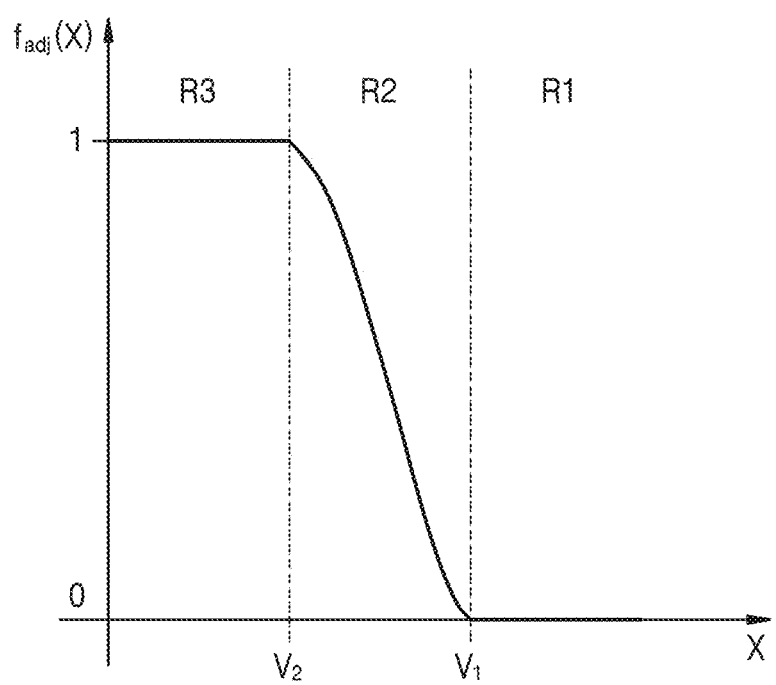
FIG. 7 is a reliability graph used to generate a reliability of second pixels of a low-resolution image according to some example embodiments.

FIG. 7 is a reliability graph used to generate a reliability of second pixels of a low-resolution image according to some example embodiments. FIG. 7 will be described with reference to FIG. 4.

Referring to FIG. 7, characteristic values generated by the pixel value characteristic generating module 112 may be applied as variables X to a reliability function $f_{adj}$, and the characteristic-based reliability generating module 114 may manage the reliability function $f_{adj}$. The reliability function $f_{adj}$ may generate a reliability close to a value '0' when the variable X exceeds a first reference value $V_1$, generate a reliability close to a value '1' when the variable X is below a second reference value $V_2$, and generate a reliability inversely proportional to the variable X when the variable X ranges from the first reference value $V_1$ to the second reference value $V_2$. The reliability function $f_{adj}$ may be divided into first to third regions R1 to R3. The first region R1 may be a region configured to generate a reliability of a second pixel having a high edge smoothing degree. The third region R3 may be a region configured to generate a reliability of a second pixel having a low edge smoothing degree. The second region R2 may be a region configured to generate a reliability of a second pixel having a middle edge smoothing degree. However, the reliability function $f_{adj}$ is only an example, and the inventive concepts are not limited thereto. A reliability function may have various forms so that a value of a pixel having a high edge smoothing degree, from among second pixels of a low-resolution image, may be limitedly reflected during edge preserving smoothing. Also, the reliability function $f_{adj}$ may have various forms according to the kind of an applied variable X. For example, when the variable X is a reciprocal of a standard deviation of values of first pixels of an input image, which correspond to each of the second pixels of the low-resolution image, the reliability function $f_{adj}$ may differ from that shown in FIG. 7.

Figure 8:
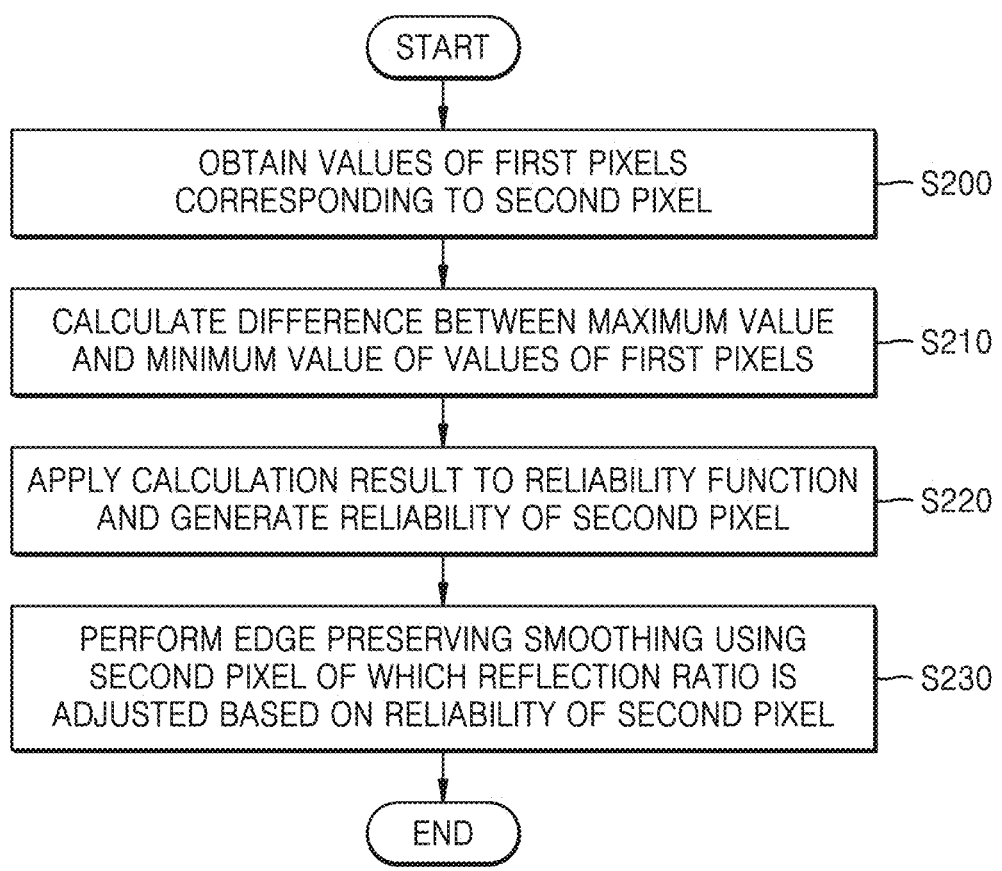
FIG. 8 is a diagram illustrating an edge preserving smoothing method of an edge preserving smoothing circuit, according to some example embodiments.

FIG. 8 is a diagram illustrating an edge preserving smoothing method of an edge preserving smoothing circuit, according to some example embodiments.

Referring to FIG. 8, the edge preserving smoothing circuit may obtain values of first pixels of an input image corresponding to a second pixel of a low-resolution image (S200). Thereafter, the edge preserving smoothing circuit may calculate a difference between a maximum value and a minimum value of the values of the first pixels (S210). The edge preserving smoothing circuit may apply a calculation result to a reliability function (S220). The edge preserving smoothing circuit may apply the calculation result to the reliability function and obtain a reliability of the second pixel. The edge preserving smoothing circuit may perform edge preserving smoothing on the input image using a value of the second pixel of which a reflection ratio is adjusted, based on the reliability of the second pixel (S230).

Figure 9:
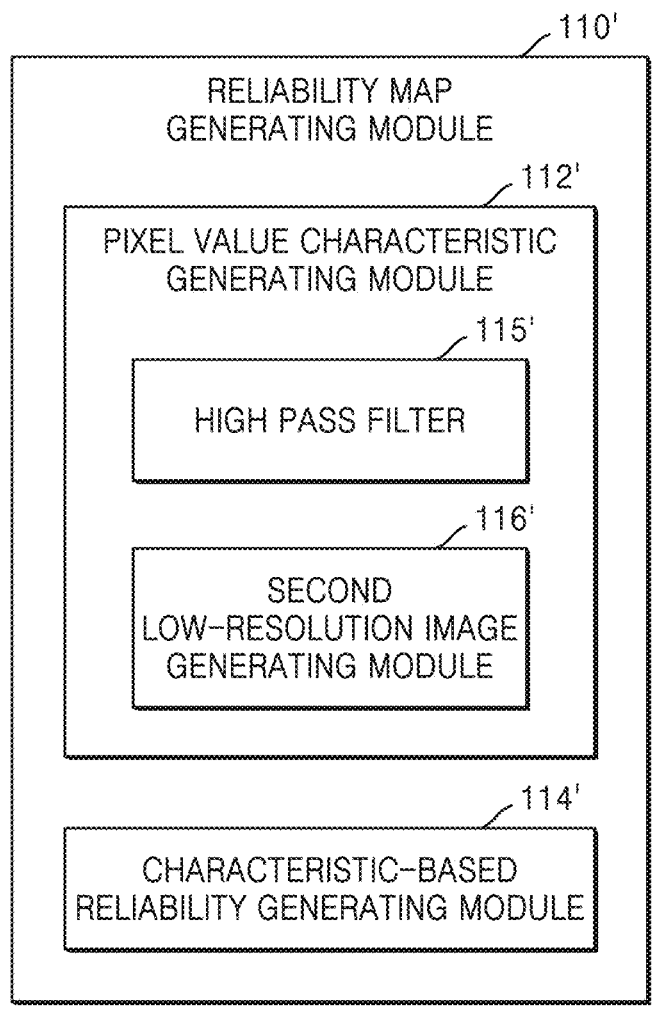
FIG. 9 is a block diagram of a reliability map generating module according to some example embodiments.

FIG. 9 is a block diagram of a reliability map generating module 110' according to some example embodiments.

Referring to FIG. 9, the reliability map generating module 110' may include a pixel value characteristic generating module 112' and a characteristic-based reliability generating module 114'. The pixel value characteristic generating module 112' may include a high pass filter 115' and a second low-resolution image generating module 116'. The high pass filter 115' may receive an input image and pass pixels having a frequency component having a predetermined (or alternatively, given) frequency band or higher. However, the pixel value characteristic generating module 112' may include a band pass filter configured to pass only a predetermined (or alternatively, given) frequency band instead of the high pass filter 115'. In this case, the band pass filter may be applied to the input image. Hereinafter, a case in which the pixel value characteristic generating module 112' includes the high pass filter 115' will mainly be described. The second low-resolution image generating module 116' may down-sample an input image filtered by the high pass filter 115' and generate a second low-resolution image. Each of pixels of the second low-resolution image may have a value corresponding to a frequency component. FIG. 9 will be described with further reference to FIG. 3B for brevity. Pixels corresponding to the first component 4A and the third component 4C of curve 4 may have a frequency component included in a low frequency band. Pixels corresponding to the second component 4B may have a frequency component included in a high frequency band. Thus, the second low-resolution image may include only the pixels corresponding to the second component 4B. In an example, as a variation degree of values of first pixels of the input image corresponding to a pixel of the second low-resolution image becomes larger, the pixel of the second low-resolution image may have a higher frequency component and thus, a pixel value of the second low-resolution image may be higher.

The characteristic-based reliability generating module 114' may generate respective reliabilities of second pixels of a first low-resolution image based on values of the pixels of the second low-resolution image. Specifically, the characteristic-based reliability generating module 114' may apply the values of the pixels of the second low-resolution image to a reliability function and match the generated reliabilities with the second pixels of the first low-resolution image, respectively. For example, a pixel 'PX_a' of the first low-resolution image may correspond to a pixel 'PX_b' of the second low-resolution image, and the characteristic-based reliability generating module 114' may apply a value of the pixel 'PX_b' to the reliability function and match a generated reliability with the pixel 'PX_a.' Thus, a reflection ratio of a value of the pixel 'PX_a' may be adjusted by the matched reliability during subsequent edge preserving smoothing.

Figure 10:
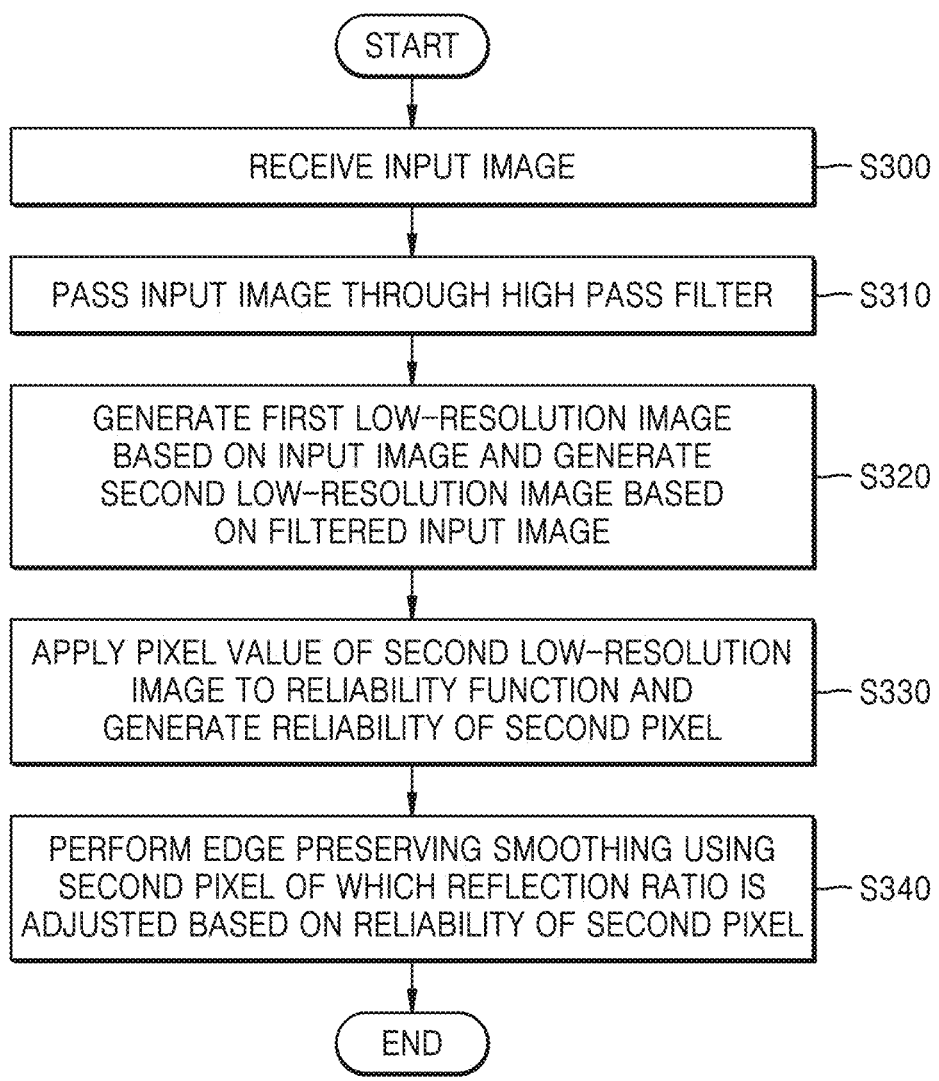
FIG. 10 is a flowchart of an edge preserving smoothing method of an edge preserving smoothing circuit, according to some example embodiments.

FIG. 10 is a flowchart of an edge preserving smoothing method of an edge preserving smoothing circuit, according to some example embodiments.

Referring to FIG. 10, the edge preserving smoothing circuit may receive an input image (S300). The edge preserving smoothing circuit may pass the input image through a high pass filter (S310). The edge preserving smoothing circuit may generate a first low-resolution image based on the input image and generate a second low-resolution image based on an input image filtered by the high pass filter (S320). The edge preserving smoothing circuit may apply a pixel value of the second low-resolution image to a reliability function and generate a reliability of a second pixel of the first low-resolution image (S330). The edge preserving smoothing circuit may perform edge preserving smoothing on the input image using a value of the second pixel of which a reflection ratio is adjusted, based on the reliability of the second pixel (S340). In the above-described manner, the edge preserving smoothing circuit may adjust a reflection ratio of each of values of second pixels for edge preserving smoothing, based on reliabilities of values of all second pixels of the first low-resolution image.

Figure 11:
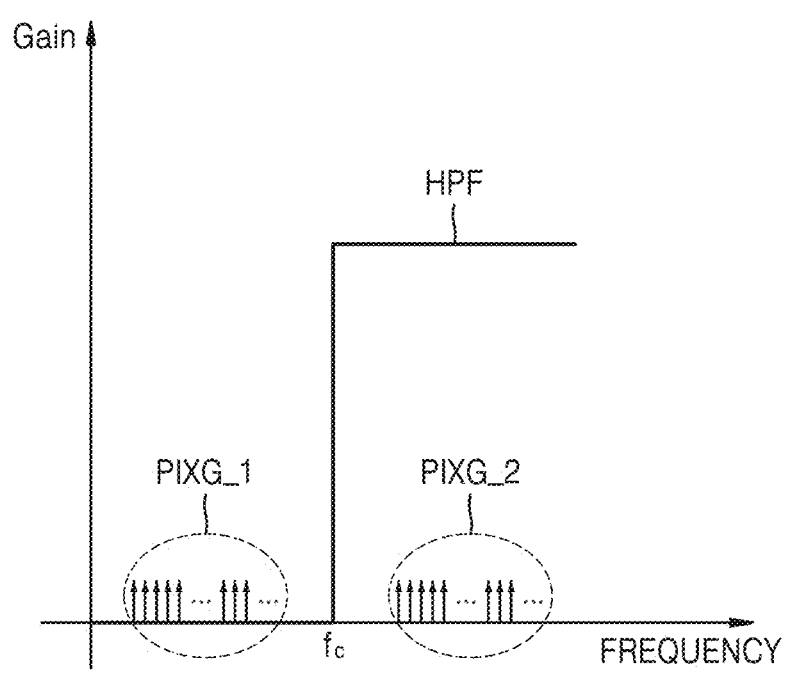
FIG. 11 is a graph for explaining a second low-resolution image shown in FIG. 9.

FIG. 11 is a graph for explaining the second low-resolution image described with reference to FIG. 9. The graph of FIG. 11 will be described with reference to FIG. 9.

Referring to FIG. 11, an input image may include a first pixel group PIXG_1 including a frequency component having a reference frequency fc or lower and a second pixel group PIXG_2 including a frequency component exceeding the reference frequency fc. When the high pass filter HPF or 115' is applied to the input image, only the second pixel group PIXG_2 may pass through the high pass filter HPF. The second low-resolution image generating module 116' may perform a down-sampling operation on the second pixel group PIXG_2 and generate a second low-resolution image. A value of a pixel of the second low-resolution image, which corresponds to the frequency component, may be determined according to a variation degree of values of first pixels of the input image, which correspond to the pixel of the second low-resolution image. For example, the value of the pixel of the second low-resolution image may be proportional to the variation degree of the values of the first pixels of the input image, which correspond to the pixel of the second low-resolution image. The characteristic-based reliability generating module 114' may apply pixel values of the generated second low-resolution image to a reliability function and generate reliabilities of second pixels of a first low-resolution image.

Figure 12:
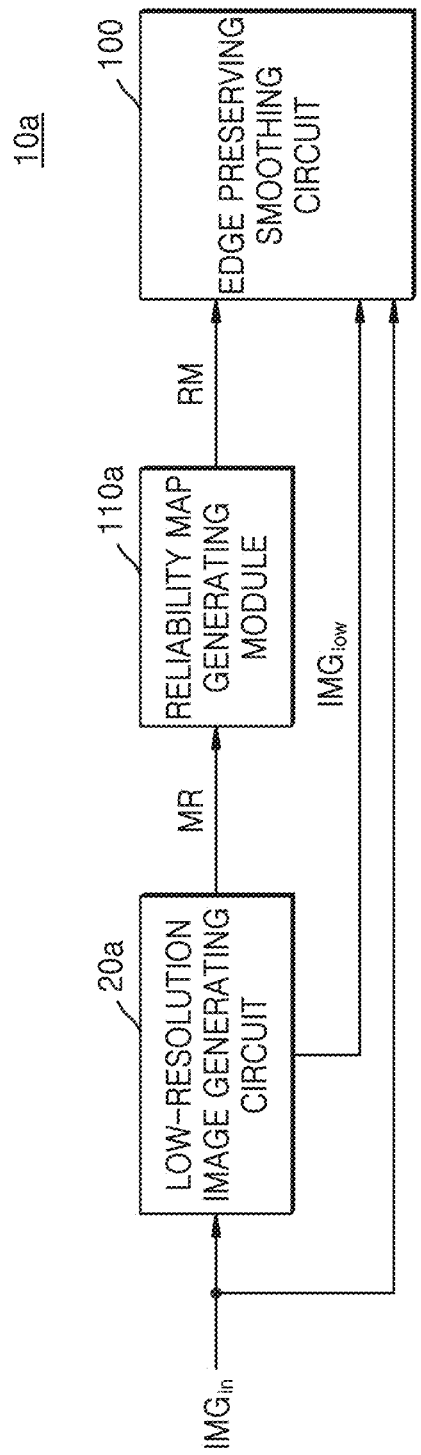
FIGS. 12 and 13 respectively are block diagrams of image processing apparatuses configured to perform edge preserving smoothing, according to some example embodiments.
Figure 13:
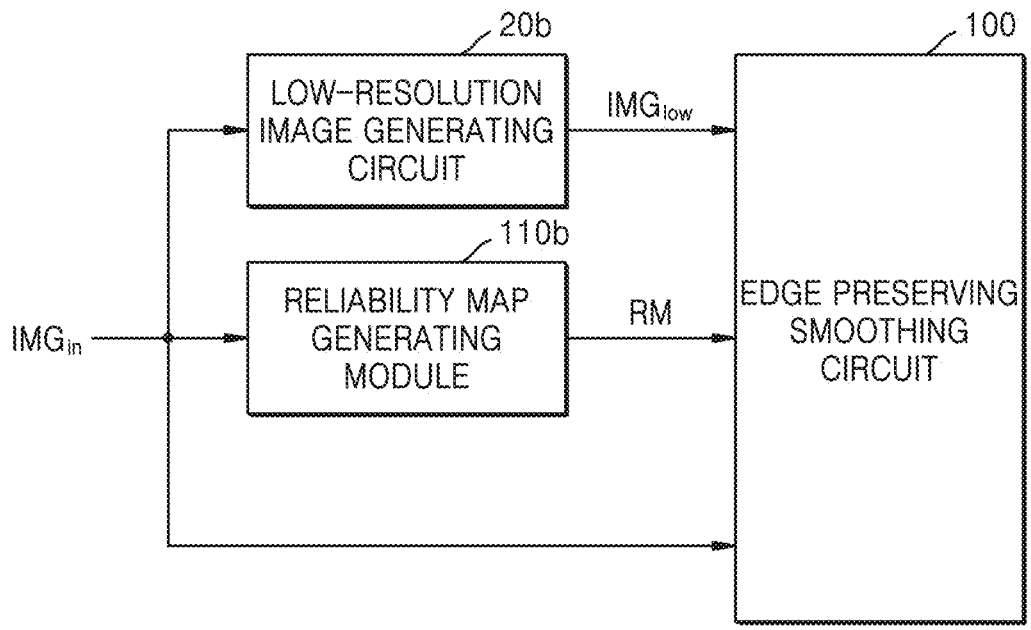

FIGS. 12 and 13 respectively are block diagrams of image processing apparatuses 10a and 10b configured to perform edge preserving smoothing, according to some example embodiments.

Referring to FIG. 12, the image processing apparatus 10a may include a low-resolution image generating circuit 20a, a reliability map generating module 110a, and/or an edge preserving smoothing circuit 100. The low-resolution image generating circuit 20a may generate a low-resolution image $IMG_{low}$ based on an input image $IMG_{in}$ and provide the low-resolution image $IMG_{low}$ to the edge preserving smoothing circuit 100. Also, the low-resolution image generating circuit 20a may provide a middle result MR required for generating the low-resolution image $IMG_{low}$ to the reliability map generating module 110a. The reliability map generating module 110a may generate a reliability map RM of second pixels of the low-resolution image $IMG_{low}$ using the middle result MR. In some example embodiments, the middle result MR may include calculation results, such as a standard distribution or variance of first pixels of the input image $IMG_{in}$. The reliability map generating module 110a may sequentially start an operation of generating the reliability map RM at a point in time when the middle result MR is received from the low-resolution image generating circuit 20a. The edge preserving smoothing circuit 100 may perform edge preserving smoothing using the reliability map RM, the low-resolution image $IMG_{low}$, and/or the input image $IMG_{in}$.

Referring to FIG. 13, the image processing apparatus 10b may include a low-resolution image generating circuit 20b, a reliability map generating module 110b, and/or an edge preserving smoothing circuit 100. The low-resolution image generating circuit 20b may generate a low-resolution image $IMG_{low}$ based on an input image $IMG_{in}$ and provide the low-resolution image $IMG_{low}$ to the edge preserving smoothing circuit 100. The reliability map generating module 110b may directly receive the input image $IMG_{in}$ in parallel with the low-resolution image generating circuit 20b and generate a reliability map RM of second pixels of the low-resolution image $IMG_{low}$. According to the above-described example embodiments, the reliability map generating module 110b may perform various operations, such as an operation of calculating a standard deviation or distribution of first pixels of the input image $IMG_{in}$, an operation of calculating a difference between a maximum value and a minimum value, and/or an operation of passing the input image $IMG_{in}$ through a high pass filter and/or a band pass filter, and generate the reliability map RM of the second pixels of the low-resolution image $IMG_{low}$. The edge preserving smoothing circuit 100 may perform edge preserving smoothing using the reliability map RM, the low-resolution image $IMG_{low}$, and the input image $IMG_{in}$.

Figure 14:
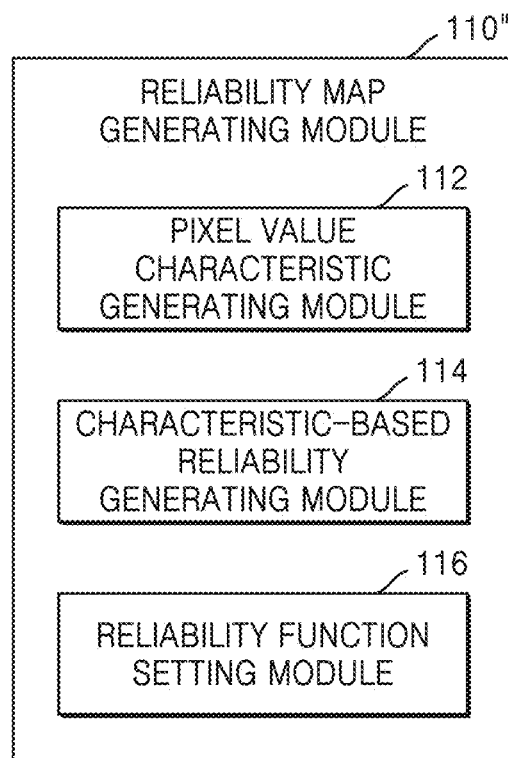
FIG. 14 is a block diagram of a reliability map generating module configured to set a reliability function, according to some example embodiments.
Figure 15A:
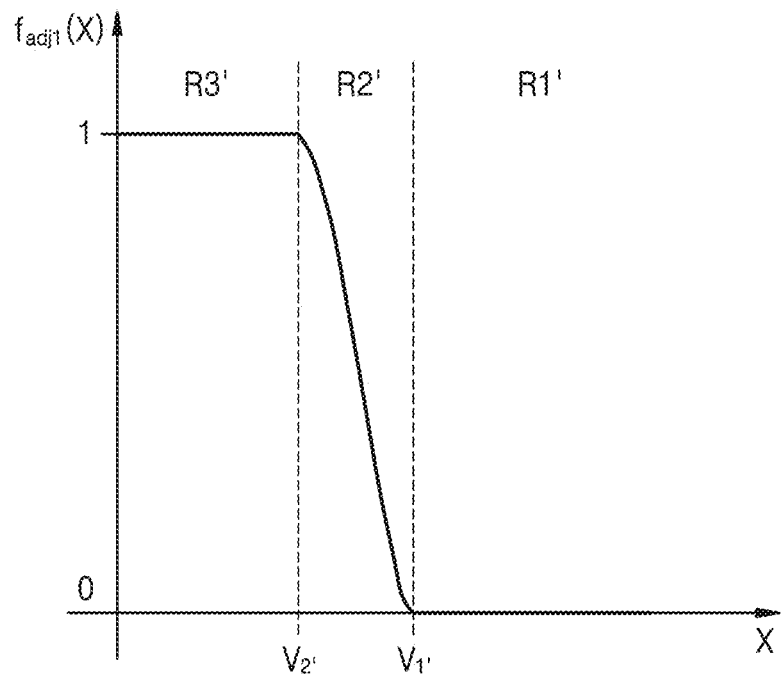
FIGS. 15A to 15C are graphs showing various forms of reliability functions.
Figure 15B:
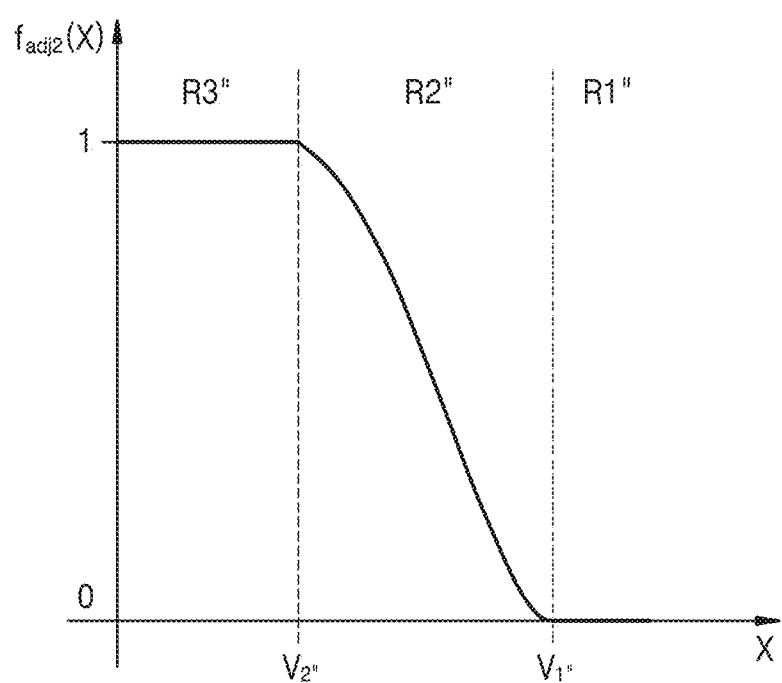
Figure 15C:
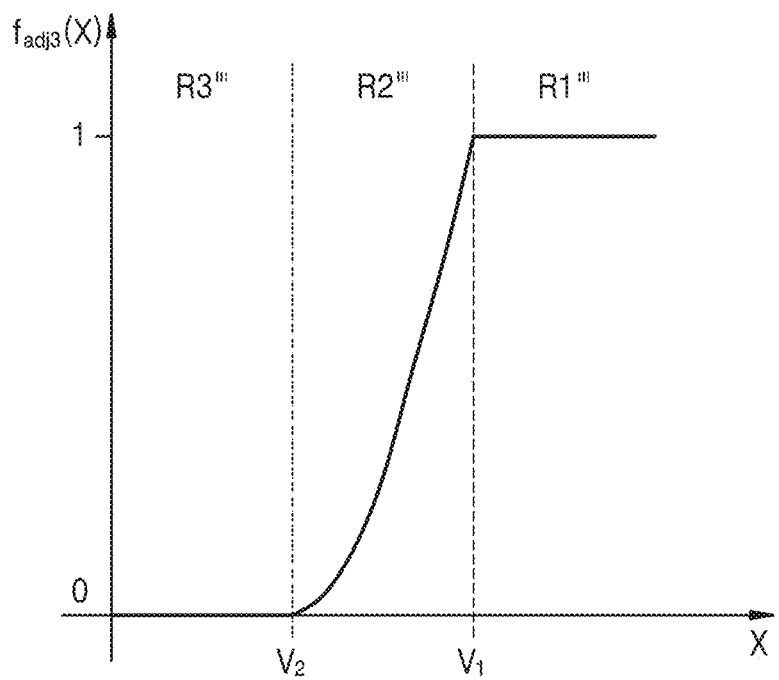

FIG. 14 is a block diagram of a reliability map generating module 110" configured to set a reliability function, according to some example embodiments. FIGS. 15A to 15C are graphs showing various forms of reliability functions $f_{adj1}$, $f_{adj2}$, and $f_{adj3}$.

Referring to FIG. 14, the reliability map generating module 110" may include a pixel value characteristic generating module 112, a characteristic-based reliability generating module 114, and/or a reliability function setting module 116. Since the pixel value characteristic generating module 112 and the characteristic-based reliability generating module 114 are described in detail with reference to FIG. 4, the reliability function setting module 116 will mainly be described.

The reliability function setting module 116 may variously determine a form of a reliability function considering sensing environments of an input image. The sensing environments of the input image may include a luminance condition, a degree of motion of a subject, and/or a noise condition when an image of the subject is captured. By changing the form of the reliability function considering the sensing environments by using the reliability function setting module 116, a reflection ratio of pixel values that deteriorate edge preserving performance may be adjusted to different degrees during edge preserving smoothing.

Referring to FIG. 15A, the reliability function setting module 116 may set the reliability function $f_{adj1}$ such that a second region R2' is narrower than in the reliability function $f_{adj}$ of FIG. 7. Referring further to FIG. 15B, the reliability function setting module 116 may set the reliability function $f_{adj2}$ such that a second region R2' is wider than in the reliability function $f_{adj}$ of FIG. 7. Referring further to FIG. 15C, the reliability function setting module 116 may set the reliability function $f_{adj3}$ to be inverted based on the abscissa in comparison with the reliability function $f_{adj}$ of FIG. 7. The reliability functions $f_{adj1}$, $f_{adj2}$, and $f_{adj3}$ of FIGS. 15A to 15C may be only an example, and the inventive concepts are not limited thereto. The reliability function setting module 116 may change the reliability functions $f_{adj1}$, $f_{adj2}$, and $f_{adj3}$ in various forms in various sensing environments so that a reflection ratio of values of a second pixel of a low-resolution image having a high edge smoothing degree may be adjusted to a small value during the edge preserving smoothing.

Figure 16:
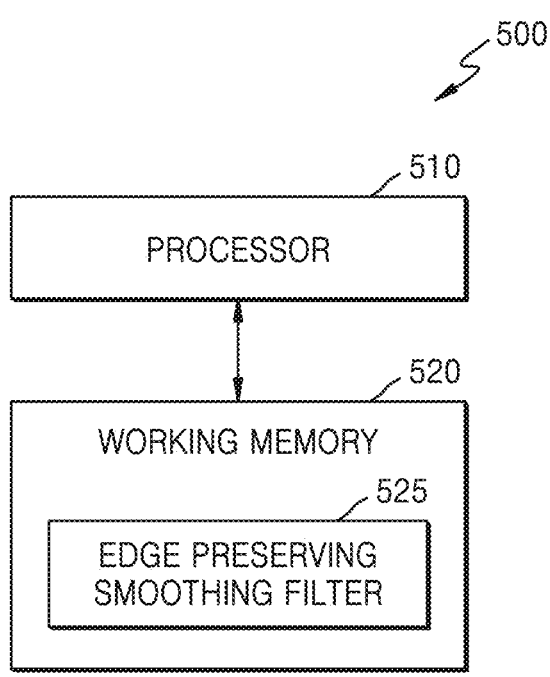
FIG. 16 is a block diagram of an example of implementing an image processing method according to some example embodiments by using software.

FIG. 16 is a block diagram of an example of implementing an image processing method according to some example embodiments by using software.

Referring to FIG. 16, an image processing apparatus 500 may include a processor 510 and a working memory 520. The working memory 520 may be a non-transitory computer-readable recording medium. The processor 510 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processor 510 may execute computer programs stored in the working memory 520. The working memory 520 may store computer programs configured to process, by using software, at least some of various functions for performing the edge preserving smoothing according to the above-described example embodiments, and the computer programs may include an edge preserving smoothing filter 525 according to the functions.

As an example, the processor 510 may perform edge preserving smoothing according to some example embodiments. For example, the processor 510 may execute an edge preserving smoothing filter 525 and generate a reliability map indicating an edge smoothing degree of each of second pixels of a low-resolution image. Thereafter, the processor 510 may execute the edge preserving smoothing filter 525 and adjust, by using the reliability map, a reflection ratio of a value of a second pixel having a high edge smoothing degree, from among the second pixels of the low-resolution image, during the edge preserving smoothing. As a result, edge preserving smoothing may be performed on a predetermined (or alternatively, given) input image by using pixel values of which a reflection ratio is adjusted.

Figure 17:
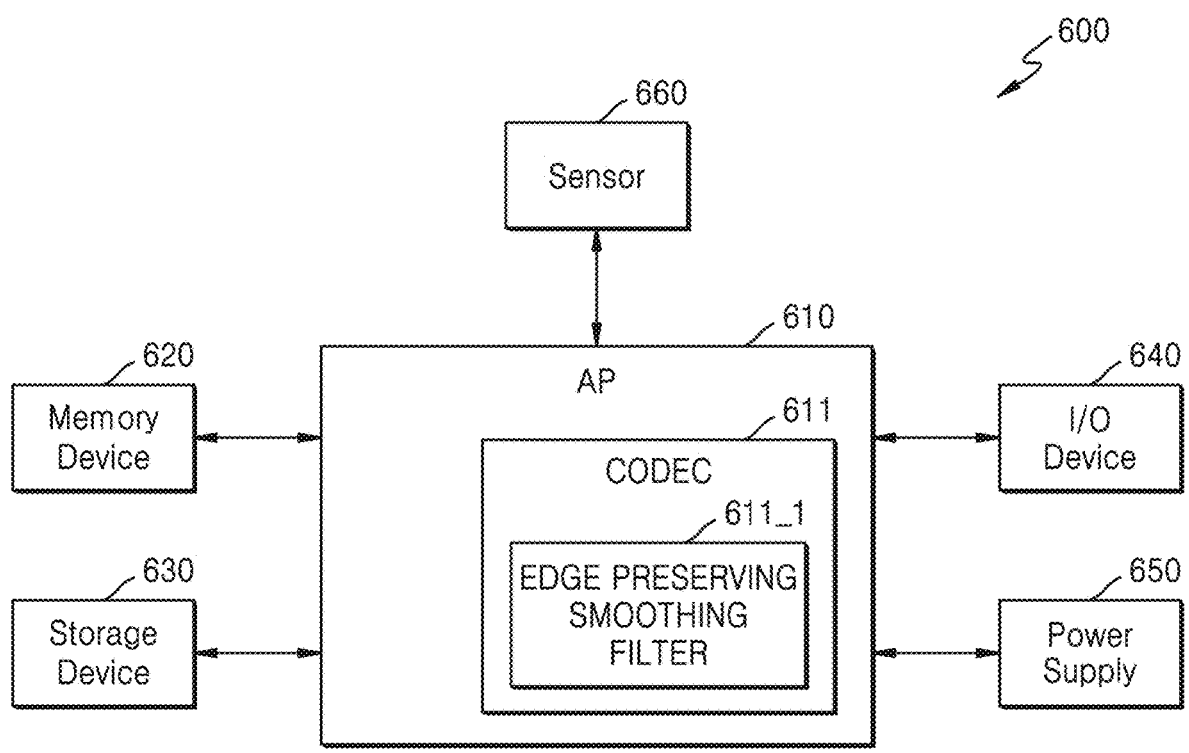
FIG. 17 is a block diagram of a computing system including an image processing apparatus according to some example embodiments.

FIG. 17 is a block diagram of a computing system 600 including the image processing apparatus according to the above-described example embodiment.

Referring to FIG. 17, the computing system 600 may include an application processor 610, a memory device 620, a storage device 630, an input/output (I/O) device 640, a power supply 650, and/or an image sensor 660. Although not shown in FIG. 17, the computing system 600 may further include ports capable of communicating with a video card, a sound card, a memory card, and/or a universal serial bus (USB) device for communicating with other electronic devices.

The application processor 610 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The application processor 610 may perform specific calculations or tasks. According to some example embodiments, the application processor 610 may include a microprocessor and/or a central processing unit (CPU). The application processor 610 may communicate with the memory device 620, the storage device 630, and/or the I/O device 640 through an address bus, a control bus, and/or a data bus. The memory device 620 may store data required for operations of the computing system 600. For example, the memory device 620 may be implemented as dynamic random access memory (DRAM), mobile DRAM, static RAM (SRAM), flash memory, phase-change RAM (PRAM), ferroelectric RAM (FRAM), resistive RAM (RRAM), and/or magnetic RAM (MRAM). The storage device 630 may include a solid-state drive (SSD), a hard disk drive (HDD), and/or a compact disk read-only memory (CD-ROM). The I/O device 640 may include an input unit (e.g., a keyboard, a keypad, and a mouse) and/or an output unit (e.g., a printer and a display). The power supply 650 may supply an operating voltage required for operations of the computing system 600.

The application processor 610 may include a codec module 611 configured to perform an image processing operation according to some example embodiments. The codec module 611 may include an edge preserving smoothing filter 611_1. The edge preserving smoothing filter 611_1 may generate a reliability map indicating an edge smoothing degree of each of second pixels of a low-resolution image. Thereafter, the edge preserving smoothing filter 611_1 may adjust, by using the reliability map, a reflection ratio of a pixel value having a high edge smoothing degree, from among the second pixels of the low-resolution image, during edge preserving smoothing. As a result, edge preserving smoothing may be performed on a predetermined (or alternatively, given) input image by using pixel values of which a reflection ratio is adjusted.

Typical example embodiments of the inventive concepts are disclosed in the above description and the drawings. Although specific terms are employed, they are used in a generic and descriptive sense only and not for purposes of limitation. It will be understood by those of ordinary skill in the art that various changes in form and/or details may be made to the disclosed example embodiments without departing from the spirit and/or scope of the inventive concepts as defined by the following claims.

What is claimed is:

1. An image processing apparatus comprising:
a processor configured to
generate a low-resolution image comprising a second pixel from an input image comprising first pixels, the second pixel corresponding to the first pixels; and
perform edge preserving smoothing on the input image using a value of the second pixel,
wherein a quality of edge preserving smoothing is enhanced by adjusting the value of the second pixel based on a reliability map, and
wherein the reliability map is based on a characteristic value of the first pixels.

2. The image processing apparatus of claim 1, wherein the processor is further configured to
generate the low-resolution image by performing a downsampling operation on the input image, and
provide the low-resolution image to an edge preserving smoothing circuit.

3. The image processing apparatus of claim 1, wherein the processor is further configured to calculate on a standard distribution or variance of values of the first pixels as the characteristic value of the first pixels.

4. The image processing apparatus of claim 1, wherein the processor is further configured to calculate a difference between a maximum value and a minimum value of values of the first pixels as the characteristic value of the first pixels.

5. The image processing apparatus of claim 1, wherein the processor is further configured to
apply a high pass filter or a band pass filter to the input image as the characteristic value of the first pixels.

6. The image processing apparatus of claim 1, wherein the processor is further configured to
apply a variable corresponding to the characteristic value of the first pixels to a reliability function, and
generate a reliability of the second pixel based on the reliability function.

7. The image processing apparatus of claim 6, wherein the processor is further configured to determine the reliability function based on image sensing environment information corresponding to the input image.

8. The image processing apparatus of claim 6, wherein the processor is further configured to set the reliability function to
generate the reliability close to a value of 0 when the variable exceeds a first reference value, and
generate the reliability close to a value of 1 when the variable is below a second reference value.

9. The image processing apparatus of claim 1, wherein the characteristic value of the first pixels are variation degrees of values of the first pixels.

10. The image processing apparatus of claim 1, wherein the characteristic value of the first pixels is used to adjust a reflection ratio of the value of the second pixel.

11. The image processing apparatus of claim 1, wherein the processor is further configured to
generate a base image indicating an edge of the input image, the base image being based on the input image due to the edge preserving smoothing.

12. The image processing apparatus of claim 1, wherein the characteristic value of the first pixels is obtained from the first pixels by a low-resolution image generating circuit.

13. An image processing apparatus comprising:
a processor configured to
generate a low-resolution image comprising a second pixel from an input image comprising first pixels, the second pixel corresponding to the first pixels; and
perform edge preserving smoothing on the input image using a value of the second pixel, wherein the value of the second pixel is adjusted based on a reliability map, and
wherein the reliability map is based on a characteristic value of the first pixels.

14. The image processing apparatus of claim 13, wherein the processor is further configured to
generate the low-resolution image by performing a down-sampling operation on the input image, and
provide the low-resolution image to an edge preserving smoothing circuit.

15. The image processing apparatus of claim 13, wherein the processor is further configured to calculate on a standard distribution or variance of values of the first pixels as the characteristic value the first pixels.

16. The image processing apparatus of claim 13, wherein the processor is further configured to calculate a difference between a maximum value and a minimum value of values of the first pixels as the characteristic value of the first pixels.

17. The image processing apparatus of claim 13, wherein the processor is further configured to
apply a high pass filter or a band pass filter to the input image as the characteristic value of the first pixels.

18. The image processing apparatus of claim 13, wherein the processor is further configured to
apply a variable corresponding to the characteristic value of the first pixels to a reliability function, and
generate a reliability of the second pixel based on the reliability function.

19. The image processing apparatus of claim 13, wherein the characteristic value of the first pixels is used to adjust a reflection ratio of the value of the second pixel.

20. An apparatus comprising:
a processor configured to
generate a low-resolution image comprising a second pixel from an input image comprising first pixels, the second pixel corresponding to the first pixels; and
perform edge preserving smoothing on the input image using a value of the second pixel,
wherein a quality of edge preserving smoothing is enhanced by adjusting the value of the second pixel based on at least one of a reliability map or a characteristic of edge pixels.

* * * * *